United States Patent Office.

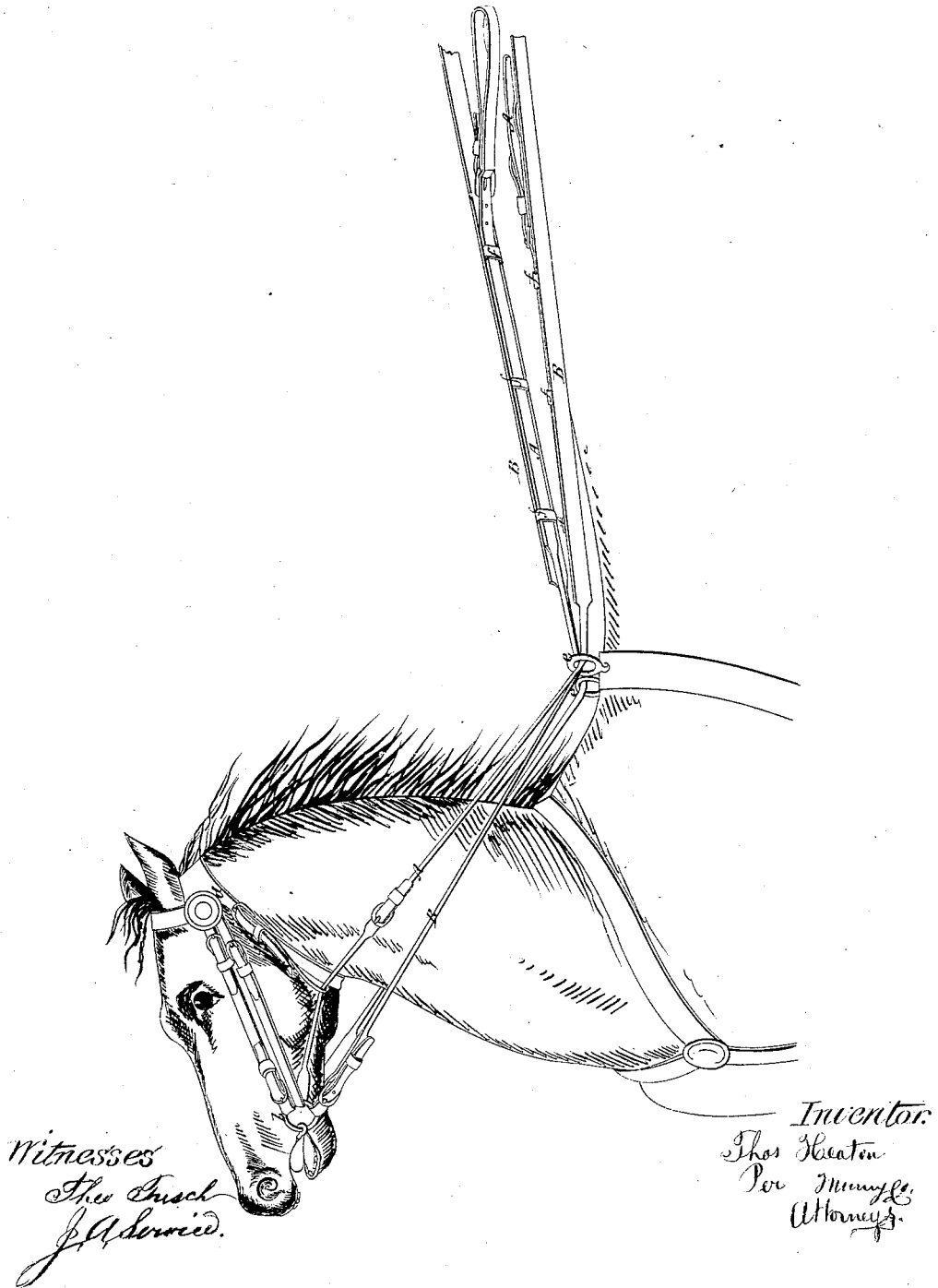

THOMAS HEATON, OF CORNWALL, NEW YORK.

Letters Patent No. 63,635, dated April 9, 1867.

IMPROVED CHECK REINS.

*The Schedule referred to in these Letters Patent and making part of the same.*

TO ALL WHOM IT MAY CONCERN:

Be it known that I, THOMAS HEATON, of Cornwall, in the county of Orange, and State of New York, have invented a new and improved Check Rein; and I do hereby declare that the following is a full, clear, and exact description thereof, which will enable others skilled in the art to make and use the same, reference being had to the accompanying drawing forming part of this specification.

The drawing represents a perspective view of this invention.

This invention relates to a check rein which is entirely distinct and separate from the ordinary or main rein, being secured to the same by loops which permit the same to work easy and independent of the main rein. Said check rein is attached to the top of the horse's head where it passes through the bit-ring, then through a loop secured to the throat-latch, and through the check-ring back to the end of the main rein, so that by pulling said check rein an upward strain is exerted on the horse's head, compelling the horse to raise his head, and preventing him effectually from kicking or running away.

A represents the check rein, which is secured to the top of the horse's head by a buckle, $a$, or in any other suitable manner. Thence said rein extends through the bit-rings $b$, and through loops $c$, which are secured to the throat-latch $d$, and back on both sides of the horse's head, through the check rings $e$ to the main rein B, to which it is attached by loops $f$. The check rein is thus permitted to work free and easy, and entirely independent of the main rein, and it can be readily handled with the same hand which handles the main rein; and by the peculiar connection of the check rein to the head, an upward strain is produced, so that by a slight pull the horse is compelled to raise his head, and he is effectually prevented from kicking or running away.

Having thus described my invention, I claim as new, and desire to secure by Letters Patent—

1. The arrangement of the check rein, main rein, and loop C, in the manner described for the purpose specified.

2. The main reins B, provided with loops $f$, in combination with the check rein A, whereby the latter can be removed and applied at pleasure, and adapted to an ordinary rein, in the manner as and for the purpose specified.

The above specification of my invention signed by me this 21st day of September, 1866.

THOMAS HEATON.

Witnesses:
WM. F. MCNAMARA,
W. HAUFF.